(12) United States Patent
Leigh

(10) Patent No.: US 6,840,569 B1
(45) Date of Patent: Jan. 11, 2005

(54) CARAVAN

(76) Inventor: Arthur Donald Leigh, 2/22 Janfourd Ct., Mount Waverley, Victoria, 3149 (AU)

( * ) Notice: Subject to any disclaimer, the term of this patent is extended or adjusted under 35 U.S.C. 154(b) by 0 days.

(21) Appl. No.: 10/624,453

(22) Filed: Jul. 22, 2003

(51) Int. Cl.$^7$ .............................................. B60P 3/355
(52) U.S. Cl. .................................. 296/173; 296/26.06
(58) Field of Search .............................. 296/165, 171, 296/173, 26.06, 26.07

(56) References Cited

U.S. PATENT DOCUMENTS

| | | | | |
|---|---|---|---|---|
| 2,920,919 A | * | 1/1960 | Spencer | 296/173 |
| 3,024,059 A | * | 3/1962 | Hagenson | 296/173 |
| 3,458,232 A | * | 7/1969 | Frank | 296/156 |
| 3,768,855 A | * | 10/1973 | Laue | 296/173 |
| 3,941,415 A | * | 3/1976 | Cooper | 296/26.07 |
| 3,995,890 A | * | 12/1976 | Fletcher | 296/26.06 |
| 4,027,912 A | * | 6/1977 | Pacca | 296/165 |
| 4,166,343 A | * | 9/1979 | O'Brian et al. | 296/173 |
| 4,768,824 A | * | 9/1988 | Andonian | 296/165 |
| 4,807,924 A | * | 2/1989 | Kottke | 296/164 |
| 5,979,972 A | * | 11/1999 | Gehman | 296/173 |

* cited by examiner

Primary Examiner—Jason Morrow
(74) Attorney, Agent, or Firm—Edwin D. Schindler

(57) ABSTRACT

A caravan having a lower body portion and an upper body portion with at least one hinge connecting the lower body portion to the upper body portion at one end of the caravan. The hinges connecting the upper and lower body portions allows the upper body portion to rotate relative to the lower body portion about an axis from a first position, where the upper body portion and the lower body portion are in close abutment, to a second position, where the upper body portion and the lower body portion have been rotated a predetermined distance about the hinge, so that the upper body portion is elevated above the lower body portion and no longer in close abutment to the lower body portion. A mechanism for elevating the upper body portion relative to the lower body portion, about the hinge member is included, along with side extension members that are in a substantially horizontal orientation when the upper body portion and the lower body portion are in their first position and being in a substantially vertical orientation when the upper body portion and the lower body portion are in their second position, so that in the second position, the substantially vertical orientation of the side extension members provides headroom within a substantial interior area of the caravan. A foldable side door permits access to the interior area of the caravan.

10 Claims, 2 Drawing Sheets

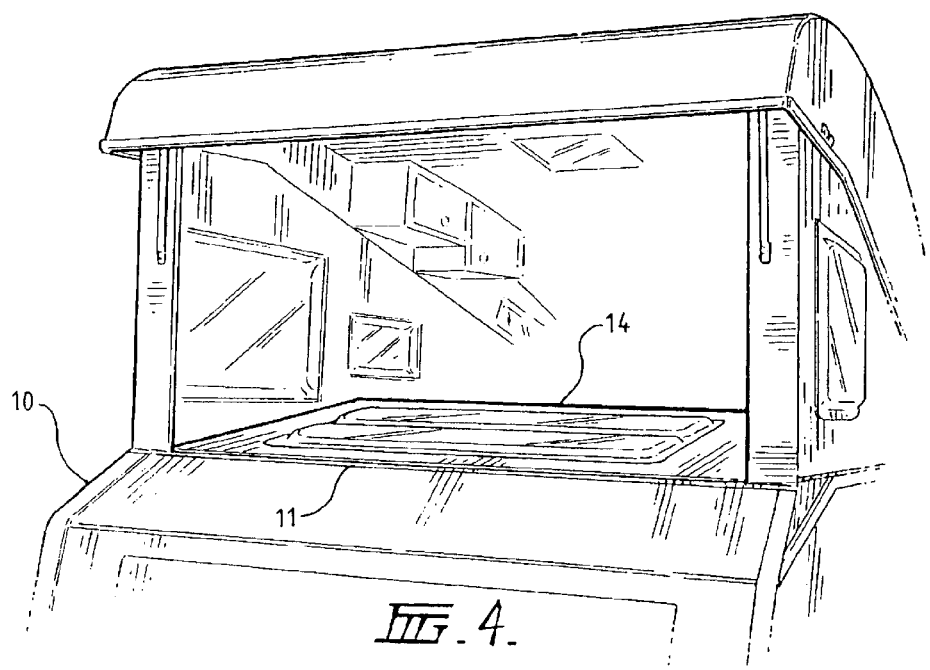
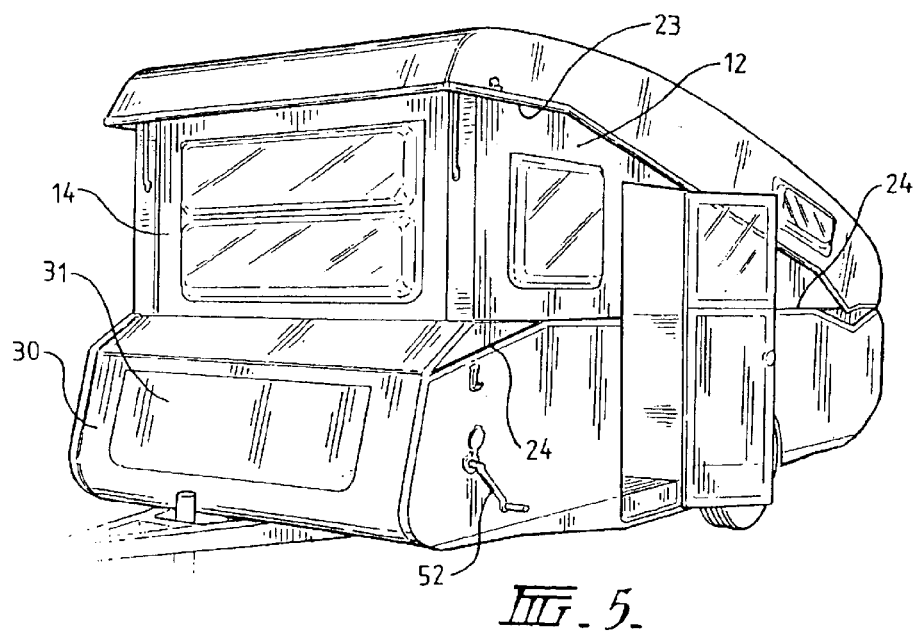

CARAVAN

AREA OF THE INVENTION

This invention relates to the area of caravans and trailable vans and in particular to such a van which exhibits a low profile when being towed but is easily convertible to a larger structure when on site.

BACKGROUND TO THE INVENTION

Caravans are normally one of two types. The conventional caravan is a solid shell which has a chassis which is adapted to be connected to a prime mover, road wheels and a body which is accessed through at least one door and which may have a quite substantial fit up on the inside thereof. The body is usually of a fibreglass/insulation sandwich.

Whilst such caravans can be exceptionally comfortable and satisfactory they have a major disadvantage in that they present substantial surfaces to wind when being towed and also occupy a relatively large volume when being stored.

The other major type of caravan, the so called "pop-tops", are basically similar as far as chassis running gear and the like are concerned but are not generally as high as standard caravans. These customarily have a portion, at least, of the roof which is adapted to move between two different positions. In one such position it is retracted and lies against the rest of the roof and in the other it is extended upwardly to provide additional head space when the caravan is being used. The base height of the caravan is usually sufficient for a user to stand therein even when the roof portion is in its lowered condition.

In order to enable the movement, the two components are normally connected by a flexible member which can permit the movement but which provides a skirt between the two members when the top is extended.

This arrangement is not as satisfactory as in a conventional caravan as the skirt member is an area of weakness and further it provides quite a substantial area exposed to the elements which is not insulated and thus makes control of the temperature inside the caravan more difficult than is the case with a standard van.

"Pop-top" caravans, whilst easier to tow than standard caravans, are also, as mentioned, relatively high and can often riot be stored in a conventional garage.

OUTLINE OF THE INVENTION

It is an object of the present invention is to provide a caravan which, when in use, has effectively the properties of a conventional caravan but when being towed or stored occupies a reduced volume and is more aerodynamic in nature than conventional caravans.

The invention provides a caravan having a lower body portion and an upper body portion which are hingedly interconnected by means of at least one hinge member, such that they can rotate about a first position when the upper and lower body portions are in close abutment and a second elevated position when the upper and lower body portions have been rotated a predetermined distance about said hinge member, by means of an elevation mechanism, said caravan being provided with side extension members which are substantially horizontal when the body portions are in the first position but, when they are in the second position, said side extension members assume a substantially vertical orientation the arrangement being such that head room is provided over a substantial area of the caravan interior.

It is preferred that said side extension members be provided with attachment means to the interior of the upper body portion.

It is preferred that the rotation of the upper and lower body portions be effected using a wind up mechanism and that this include a handle located on the exterior of the lower body portion.

It may be preferred that the wind up mechanism elevate either the upper body portion or elevate at least one side extension member thereby causing the upper body portion to become elevated. Any other appropriate elevation mechanism could however be used.

It is preferred that when the upper and lower body portions are in their first position the sides are disposed substantially horizontally within the interior of the caravan without the necessity of disturbing any interior furnishings.

It is also preferred that the caravan be hinged at its rear face and opposite from the face to which a towing mechanism is attached.

It is further preferred that the sides be manufactured from a firm fabrication rather than be soft sided. While any appropriate manufacturing material may be used it may be preferred that aluminium, wood, fibreglass or a fibreglass/insulation sandwich be used.

It may also be preferred that the lower body portion be provided with a storage compartment and that this compartment preferably be removable.

In order that the invention may be more readily understood we shall describe by way of non limiting example one particular embodiment of the invention with reference to the accompanying drawings. As previously stated the upper portion of the caravan of the invention could be elevated by some appropriate mechanism however in the embodiment described here side extension members are elevated thereby causing the upper body portion to become elevated.

OUTLINE OF THE DRAWING FIGURES

FIG. 4 Shows the caravan prior to the front windows being pushed into position; and FIG. 5 Shows the caravan when ready for habitation;

The embodiment of the invention shown in the above Figures is a caravan 1 manufactured substantially from a foam/fibreglass sandwich construction although any appropriate material may be used such as a wood or aluminium frame sheathed with wood or aluminium and having insulating material there between.

The chassis, running gear and connection to a prime mover are completely conventional.

Figure 1:
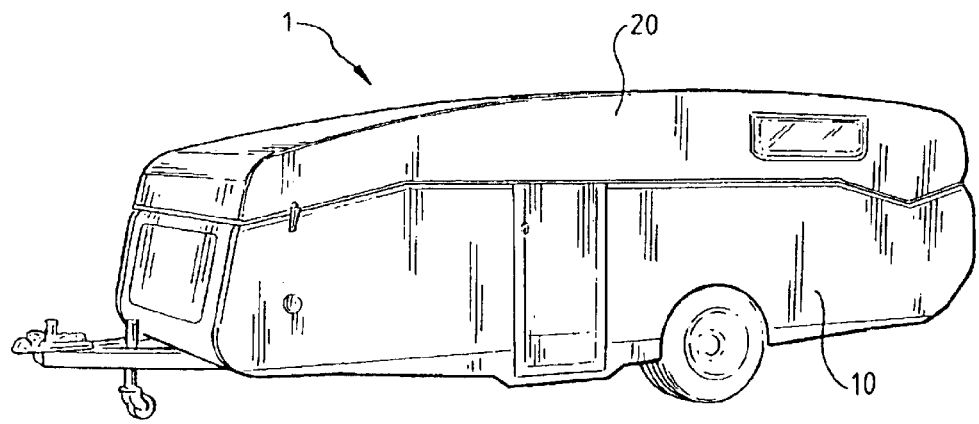
FIG. 1 Shows the caravan in towing mode.
Figure 2:
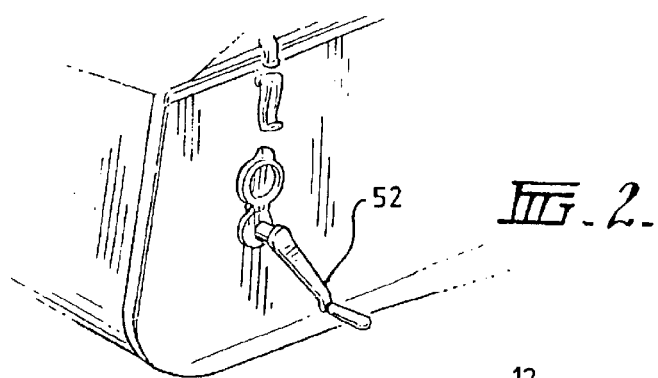
FIG. 2 Shows the handle mechanism for raising the upper portion of the caravan.
Figure 3:
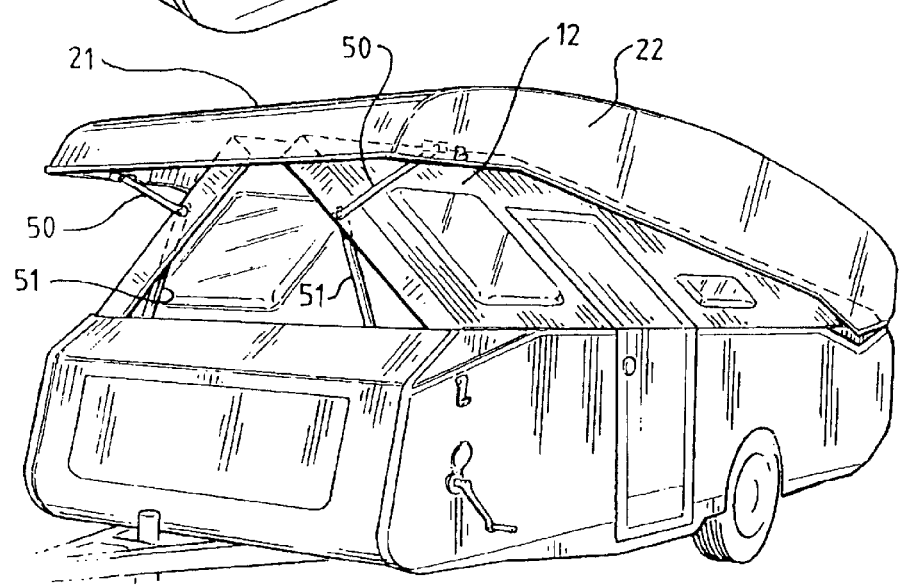
FIG. 3 Shows the partially elevated sides of the caravan.

To a large extent the lower body portion 10 of the caravan can also be considered to be conventional and can be fitted out internally with tables, benches, stove and sink and other standard fittings as required to the level of the top of the lower portion 11 (FIGS. 3 and 4). In the embodiment of the invention shown a removable storage compartment 30 is provided at the front of the caravan, this compartment being accessible through door 31.

The upper body portion 20 of the caravan comprises the roof 21 of the caravan and includes downwardly directed extensions 22 the lower edge 23 of which abuts with edge 24 of the lower body portion 10 when the caravan is closed.

Hinging connection is provided between the upper and lower body portions at the rear of the caravan and, as described above, the upper and lower portions are arranged to fold down to a position where they are in close abutment and a seal arrangement at 23,24 may be provided around the peripheral edges so that when the upper portion is in abutment with the lower portion there is a sealing connection made there between.

Connected along the side walls of the lower portion and moveable from a position where they are effectively at right angles to the walls, to a position where they are effectively a continuation of the walls of the lower body portion are side wall extensions 12 and front wall extension 14.

These are shaped so that when the upper body portion is in its raised position (FIG. 5) they can be located between the lower and upper body portions and in fact effectively be a continuation of the lower body portion and locate inside the downwardly extensions 22.

These wall extensions may be made of the same material as the caravan body and are provided, as required, with windows and a door.

The arrangement generally is such that when the two body portions are in abutment the wall extensions lie inwardly more or less horizontally within the body of the caravan and when the roof is in its extended position, the wall extensions lie along the same line as the upper body portion, terminate within the upper body portion in abutment with the inner surface thereof.

The actual means of moving the body portions, and the wall extensions, one relative to the other, can be of a number of different forms but in the simple mechanical form shown in this embodiment of the invention rod members 50 are connected between a side wall extension and the roof interior and further rod members 51 between side walls and the lower body portion. The arrangement is such that the upper body portion 20 is raised when the side wall extensions are raised using what may be a conventional winding mechanism, and operated conveniently by handle 52, until the side wall extensions 12 move to a vertical position. The rods which cause the upward movement can effectively lie alongside or in a recess formed in or associated with the wall extension so as not to intrude into the caravan when the roof is fully raised.

In order to complete the caravan, the front wall extension 14 which is hingedly connected to lower body portion 10 at 11 can be pushed upright and located inside the caravan roof and it may be provided with a clip or the like so that it is attached to the upper body portion and retained in position until it is required to lower the upper body portion. This panel may also be made of a plastic sandwich material and can, if required, be provided with a window or the like, as in this embodiment of the invention, which can be of a very substantial size.

By providing an arrangement as described we can provide a caravan which, when in its folded position, can readily be lower than the conventional "pop-top" caravan, as with "pop-tops" the degree of lifting of the roof portion is relatively limited. The caravan of the invention will tow at least as well as a "pop-top" and can be of a size to be fitted into a conventional garage without difficulty while providing the headroom of a conventional caravan over a substantial portion of its internal useable area when erected.

When it is desired to use the caravan it is an extremely quick operation. It is only necessary to effect movement of the wind up mechanism to cause the side wall extensions to rise and these in turn automatically cause the upper body portion to rise and when they are in the fully raised position a person only needs to go into the caravan, and the door would normally be in two parts, one located in the lower body portion and the other in the appropriate wall extension, locate the front panel and clip it into position. This is an operation which takes, at most, minutes.

The head room of the caravan over a substantial portion of its length can be well over two meters and the area of lowest head room, close to the hinge at the rear of the caravan, would normally be at the position of the bed head of the caravan where it is not usual for any person to wish to stand.

We can, if required, increase the head room somewhat at this area by lowering the floor behind the vehicle axle to a level lower than that of the remainder of the caravan although this is not necessary and is not part of the invention.

Whilst in this embodiment we have described the caravan as having the two body portions hinged at the rear, and we believe that this is the most practical arrangement, it would be equally possible to have the caravan pivoting about its front edge in which case the caravan would be basically a mirror image of the one described or along one side. This latter would give a maximum length of the volume with high head room but generally may not be as suitable as the described embodiment as far as usable space is concerned.

Also, as we have previously mentioned, the mechanical arrangement to cause the raising and lowering of the upper body portion can vary widely and any modifications to this are deemed to be part of the invention.

Also, we have not described fully the method of sealing the caravan but the problems of sealing are met by manufacturers in this industry and the approaches which could be taken are well known.

Also, it would be possible to raise the upper body portion independently of the side wall extensions but, for convenience of operation, it will be appreciated that the arrangement whereby the movement of the side wall extensions effectively causes the movement of the upper body portion is a very simple system and can be used by even the most unskilled persons quite satisfactorily.

The various modifications to the caravan are to be deemed to be part of the present invention.

The claims defining the invention are as follows:

1. A caravan, comprising:
    a lower body portion;
    an upper body portion;
    means for hingedly connecting said lower body portion to said upper body portion at only one end of said caravan, said means for hingedly connecting including at least one hinge member for allowing said upper body portion to rotate relative to said lower body portion about an axis created by said at least one hinge member from a first position, where said upper body portion and said lower body portion are in close abutment, to a second position, where said upper body portion and said lower body portion have been rotated a predetermined distance about said at least one hinge member, so that said upper body portion is elevated above said lower body portion and no longer in said close abutment to said lower body portion;
    means for elevating said upper body portion relative to said lower body portion about said at least one hinge member from said first position to said second position and vice-versa;
    side extension members being in a substantially horizontal orientation when said upper body portion and said lower body portion are in said first position and being in a substantially vertical orientation when said upper body portion and said lower body portion are in said second position, so that in said second position, said substantially vertical orientation of said side extension members provides headroom within a substantial interior area of said caravan; and, a foldable side door for accessing said substantial interior area having been provided with said headroom when said side extension members are in said substantially vertical orientation.

2. The caravan according to claim 1, wherein said upper body portion assumes said second position via said means for elevating acting on at least one extension member of said side extension members.

3. The caravan according to claim 1, wherein said upper body portion assumes said second position via said means for elevating acting directly on said upper body portion.

4. The caravan according to claim 1, wherein said means for elevating is a wind-up mechanism.

5. The caravan according to claim 1, wherein said side extension members are oriented so that, when said upper body portion and said lower body portion are in said first position, said side extension members are disposed substantially horizontally within said substantial interior area without having to disturb any interior furnishings.

6. The caravan according to claim 5, further comprising a rear face and a front face with said at least one hinge member being located on said rear face and being situated opposite from said front face having a towing mechanism.

7. The caravan according to claim 1, wherein said side extension members are manufactured from a firm fabrication.

8. The caravan according to claim 1, wherein said caravan is manufactured substantially from aluminum.

9. The caravan according to claim 1, wherein said caravan is manufactured substantially from a fiberglass/insulation sandwich material.

10. The caravan according to claim 1, wherein said means for elevating is a wind-up mechanism comprising a handle located on an exterior side of said lower body portion.

* * * * *